No. 620,265. Patented Feb. 28, 1899.
J. E. WINDLE.
RUST GUARD FOR PIPE COUPLINGS.
(Application filed Dec. 22, 1897.)
(No Model.)
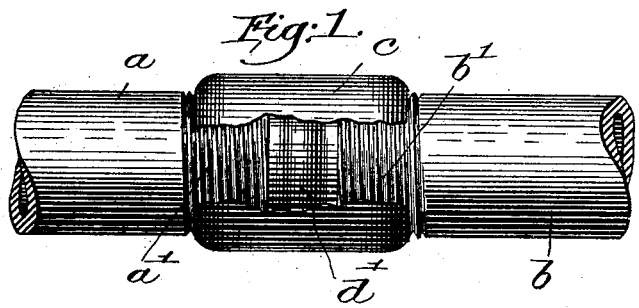
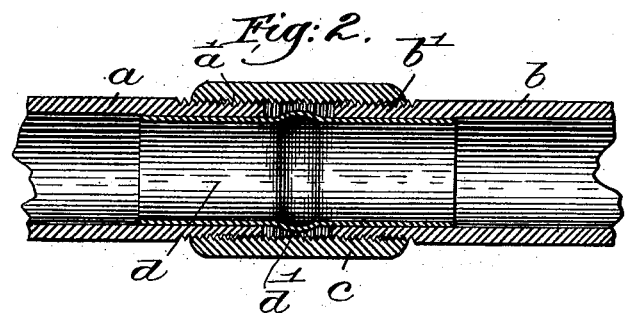
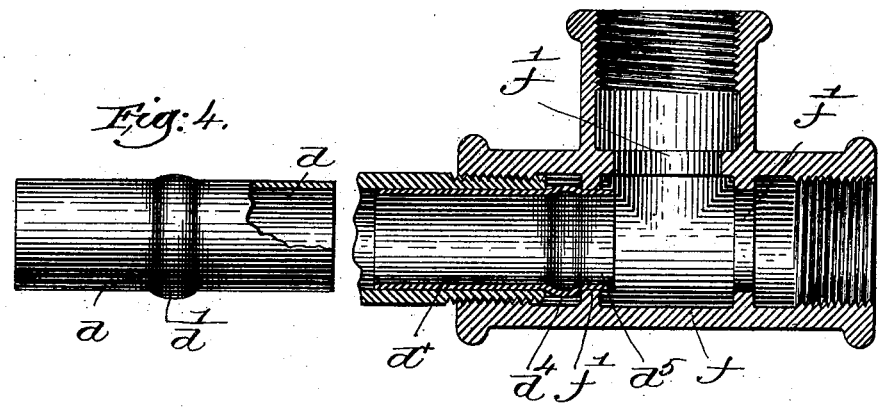
Witnesses.
Edward F. Allen.
Fred L. Greenleaf.
Inventor:
John E. Windle.
By Crosby Gregory,
Attys.

UNITED STATES PATENT OFFICE.

JOHN E. WINDLE, OF WORCESTER, MASSACHUSETTS.

RUST-GUARD FOR PIPE-COUPLINGS.

SPECIFICATION forming part of Letters Patent No. 620,265, dated February 28, 1899.

Application filed December 22, 1897. Serial No. 662,980. (No model.)

*To all whom it may concern:*

Be it known that I, JOHN E. WINDLE, of Worcester, county of Worcester, State of Massachusetts, have invented an Improvement in Rust-Guards for Pipe-Couplings, of which the following description, in connection with the accompanying drawings, is a specification, like letters on the drawings representing like parts.

Iron piping is usually galvanized or otherwise treated to prevent the formation of rust; but in placing the pipe in position and in threading for couplings the galvanizing or other protection thereat is either destroyed or greatly damaged. As a result, rust forms at the pipe end within the coupling and the formation sooner or later seriously impedes or altogether stops the flow of water or other fluid through the pipe. In actual practice iron piping has to be taken out and renewed very frequently on account of the rust formation in the coupling, the protective treatment of the pipe at other portions preventing rust. For many purposes iron pipe is thoroughly well adapted for use except for the objection noted, and on account of its comparative cheapness it is very largely used.

My present invention has for its object the production of means for preventing the formation of rust in couplings from entering the channel, and thereby impeding the free passage of the contents of the pipe.

Figure 1, in side elevation and partially broken out, represents a common form of pipe-coupling with my invention applied thereto. Fig. 2 is a longitudinal sectional view thereof. Fig. 3 is a like view of a T-coupling, showing the manner of using my invention therewith; and Fig. 4 is a side elevation, partially broken out, of a rust-guard embodying my invention.

Referring to Figs. 1 and 2, it is supposed that the pipe-sections $a$ and $b$ represent galvanized or other protected iron pipe threaded at $a'$ $b'$, respectively, to engage the usual interiorly-threaded coupling collar or sleeve $c$. Ordinarily rust forms within the coupling on the unprotected ends of the pipe-sections and in time extends into the channel-way to stop or greatly impede the passage of the fluid contents of the pipe. To prevent this, I have provided a rust-guard, shown as a short open-ended tube $d$, Fig. 4, of such external diameter as will easily enter the pipe end and project therefrom and made of copper, brass, or other suitable non-rusting material.

In a coupling of ordinary form (shown in Figs. 1 and 2) the guard is long enough to enter both pipes $a$ and $b$, and to prevent it from slipping out of place the guard is provided with an external projection, shown herein as an annular external bead $d'$. This stop projection lies between the adjacent ends of the pipe-sections, and the guard cannot slip into one pipe and out of the other.

It will be seen from Fig. 2 that any rust formation on the pipe ends or on the interior of the coupling $c$ cannot enter the channel-way, so that the latter cannot became closed or choked from any such cause.

The rust-guard is made of thin material, so that little impediment to flow is presented thereby, and the guard is readily inserted when coupling, the sleeve $c$ being first screwed onto one pipe. Then the guard is slipped into the pipe end, and the other pipe-section is then screwed into the coupling-sleeve, the adjacent end of the guard entering this latter section as it is screwed home.

In applying the rust-guard to a T-coupling, as in Fig. 3, the coupling $f$ is provided with internal annular shoulders $f'$ to hold the guard in its pipe, each pipe-section in this case having its own separate guard $d^x$, the part $d^5$, beyond the positioning projection $d^4$, being made quite short, so as to avoid interfering with the other guards. Each guard is thus held in place with its projecting stop $d^4$ between the end of the pipe-section and the adjacent corresponding shoulder $f'$ of the coupling.

When applying the guard to a T-coupling, the guard is inserted in the pipe end before the latter is screwed into the coupling.

Having fully described my invention, what I claim, and desire to secure by Letters Patent, is—

1. A rust-guard for pipe-couplings, consisting of an open-ended tube adapted to be loosely inserted in and in contact with the interior of the pipe and project beyond the end thereof, said guard having an external projection to limit the insertion of the guard in the pipe end, said guard forming no part of the coupling, substantially as described.

2. In a pipe-coupling, a connecting, threaded collar, the pipe lengths having threaded ends to engage the collar, and a non-rusting tubular guard independent of the coupling, loosely inserted in and projecting from the pipe ends and having an external projection to prevent improper longitudinal movement of the guard, substantially as described.

3. A rust-guard for pipe-couplings, consisting of an open-ended non-rusting tube having an external annular rib, said tube being adapted to be inserted loosely in and project from the pipe end within the coupling, and forming no part of the latter, substantially as described.

In testimony whereof I have signed my name to this specification in the presence of two subscribing witnesses.

JOHN E. WINDLE.

Witnesses:
JOHN C. EDWARDS,
ALEXANDER C. PROUDFIT.